(12) United States Patent
Wallrafen

(10) Patent No.: US 6,293,145 B1
(45) Date of Patent: Sep. 25, 2001

(54) SENSOR FOR ACCURATE MEASUREMENT OF LEVELS IN IRREGULARLY SHAPED TANKS

(75) Inventor: Werner Wallrafen, Hofheim (DE)

(73) Assignee: Mannesmann VDO, Frankfort am Main (DE)

( * ) Notice: Subject to any disclaimer, the term of this patent is extended or adjusted under 35 U.S.C. 154(b) by 0 days.

(21) Appl. No.: 09/290,595

(22) Filed: Apr. 13, 1999

(30) Foreign Application Priority Data

Apr. 14, 1998 (DE) ............................................. 198 16 455

(51) Int. Cl.[7] ..................................................... G01F 23/00
(52) U.S. Cl. .................... 73/304 C; 73/290 R; 340/450; 340/612
(58) Field of Search ............................. 73/304 C, 290 R, 73/304 R; 340/612, 450

(56) References Cited

U.S. PATENT DOCUMENTS

| | | | |
|---|---|---|---|
| Re. 23,844 | * 6/1954 | Condon ............................. | 73/304 C |
| Re. 34,731 | * 9/1994 | Lee et al. ........................... | 73/304 C |
| 2,741,124 | * 4/1956 | Meyers .............................. | 73/304 C |
| 3,281,815 | * 10/1966 | Oster .................................. | 73/295 |
| 3,862,571 | * 1/1975 | Vogel ................................. | 73/304 C |
| 4,487,066 | * 12/1984 | Pardi et al. ....................... | 73/304 C |
| 4,589,077 | * 5/1986 | Pope .................................. | 73/304 C |
| 5,103,368 | * 4/1992 | Hart .................................... | 73/304 C |
| 5,144,835 | 9/1992 | McDonald . | |
| 5,423,214 | * 6/1995 | Lee ..................................... | 73/304 C |
| 5,747,689 | * 5/1998 | Hampo et al. .................... | 73/304 C |

FOREIGN PATENT DOCUMENTS

| | | | |
|---|---|---|---|
| 3926218 | 10/1991 | (DE) . | |
| 2662249-A1 | * 5/1990 | (FR) ................................... | 73/304 C |
| 6379016 | 4/1988 | (JP) . | |

* cited by examiner

Primary Examiner—Hezron Williams
Assistant Examiner—Michael Cygan
(74) Attorney, Agent, or Firm—Mayer, Brown & Platt

(57) ABSTRACT

A sensor for measuring the filling level of a fluid in a vessel, in particular fuel tank is disclosed. The sensor has an electrode group which extends vertically over the fillable vessel height, and dips into the fluid and which forms electrical capacitors whose capacitances change in a measurable fashion when there are changes in the filling level. The capacitances are determined by a connected evaluation circuit and are represented as a signal which describes the filling level. There is at least one measuring electrode which extends over the entire fillable vessel height. A plurality of reference elements are arranged at different reference heights within the fillable vessel height. Optionally, a plurality of measuring electrodes are arranged in such a way that each measuring electrode has a significant change in width at a reference height assigned to it, and wherein the entire fillable vessel height is passed over by the measuring electrodes. An advantageous method for measuring the filling level is also disclosed.

14 Claims, 4 Drawing Sheets

SENSOR FOR ACCURATE MEASUREMENT OF LEVELS IN IRREGULARLY SHAPED TANKS

FIELD OF INVENTION

The invention relates to a sensor for measuring the filling level of a fluid in a vessel, in particular a fuel tank. The sensor has an electrode group which extends vertically over the fillable vessel height and dips into the fluid and which forms electrical capacitors whose capacitances change in a measurable fashion when there are changes in the filling level. The capacitances are determined by a connected evaluation circuit and represented as a signal which describes the filling level.

BACKGROUND OF THE INVENTION

Various arrangements and systems are known for measuring the filling level, in particular, in fuel vessels. For example, in the case of capacitive filling level sensors such as are known from U.S. Pat. No. 2,700,901, a rod-shaped capacitor is dipped vertically into the fluid. The fluid and the gas located above it act as dielectrics with different dielectric constants of this capacitor. When the filling level changes, the capacitance of the capacitor also changes, and it is consequently used as a measurement variable for the filling level in the vessel.

By means of various influences, such as fabrication tolerances, long-term change and the change in the composition of the fluid in the vessel, the characteristic curve of such a filling level sensor changes. In addition, after manufacture, adjustment is necessary in order to compensate for tolerances. A large number of fluids also separate out when standing over a relatively long period or they combine with other substances such as water, and thus change their physical properties, including their dielectric constants, independently.

For these reasons, when capacitive sensors which operate continuously are used, measuring errors occur, since, in addition to the filling level, the height-dependent dielectric constants also affect the filling level measurement in a nondeterministic way.

In order to avoid these disadvantages, discretely operating filling level sensors have been disclosed. Such capacitively operating sensors have a large number of individual capacitors distributed over the entire measured height. The greater the number of measurement points, the greater the resolution of the sensor. This arrangement is independent of changes in the dielectric constant of the fluid and is thus immune to the abovementioned sources of error. Unfortunately, it is extremely complex and expensive. In addition, the resolution which can be achieved with such sensors is often too low, which is a further disadvantage particularly in situations where there are small filling levels.

The object of the present invention is to specify a filling level sensor which can be manufactured cost-effectively and simply, which operates precisely and without maintenance and which is largely independent of changes in the dielectric constant of the filling material.

SUMMARY OF THE INVENTION

The object is achieved with a first variant of the invention by virtue of a sensor having at least one measuring electrode which extends over the entire fillable vessel height, and a plurality of reference elements which are arranged at different reference heights within the fillable vessel height.

In a second variant of the invention, the solution is achieved by virtue of a sensor having a plurality of measuring electrodes which are arranged in such a way that each measuring electrode has significant change in width at a reference height assigned to it, and that the entire fillable vessel height is passed over by the measuring electrodes.

A continuous measurement of the filling level takes place in each case between the reference heights. By virtue of the geometric characteristics which the electrodes of the sensor have at the reference heights, discontinuities arise in the course of the electric characteristic variables of the sensor when the surface of the fluid passes over the reference heights. These discontinuities serve as reference marks for the measurement and are used by the connected evaluation electronics to correct the display.

A first refinement of the invention provides for an opposing electrode which forms electric capacitors with all the measuring electrodes. In addition, in a first development of the invention there is provision for the reference elements to be reference electrodes and also for the one opposing electrode to form electrical capacitors with all the reference electrodes. As a result, the number of electric connections necessary is reduced to a minimum and the design of the sensor becomes very simple.

In another refinement of the sensor according to invention it is provided that the reference elements are thermistors. Such components have proven their value and are therefore provided as an alternative to the capacitive technique.

Another development provides for the distances between the reference heights at small filling levels to be smaller than at large filling levels. In this way, the residual amount of fluid which is still present when the tank is almost empty can be determined relatively precisely.

So that a clear division of the filling volume can be represented on the display of the filling level with little expenditure, in a subsequent development of the invention the reference heights are selected such that even if the vessel is irregularly shaped, a regular division of the filling volume by the reference heights is produced.

The fabrication of the sensor according to the invention may be made very simple if the electrode group, as is provided in other refinements of the invention, is arranged on a bent carrier, and if the evaluation circuit is arranged on the same carrier as the electrode group. The carrier may be provided with the circuit and the electrodes before the bending operation, when it still has an easy-to-handle shape.

Because this material is very robust and durable, there is provision, in another refinement according to the invention, that the carrier for the electrode group is composed of enameled sheet steel.

In order to simplify the fabrication further, there is provision that the electrode group is implemented on its carrier as a printed circuit.

A method according to the invention for measuring the filling level is achieved by means of a sensor according to the invention. The filling level display is corrected with the discontinuities in the electrical behavior of the sensor. These results rely on the arrangement of the measuring electrodes and reference elements when the filling level changes beyond a reference height.

As a further possible means of correcting the filling level measurement, there is a provision in one development of the method according to the invention that the measurement signal of the filling level sensor is corrected with a signal relating to the removal of fluid, in particular fuel consumption.

This is achieved according to the invention that the total value of the fluid removal of which is converted into a height value is subtracted from the last measured value of the filling level, at least between two reference heights, and the current measured value is corrected with the result.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DETAILED DESCRIPTION OF THE PREFERRED EMBODIMENT

Figure 1:
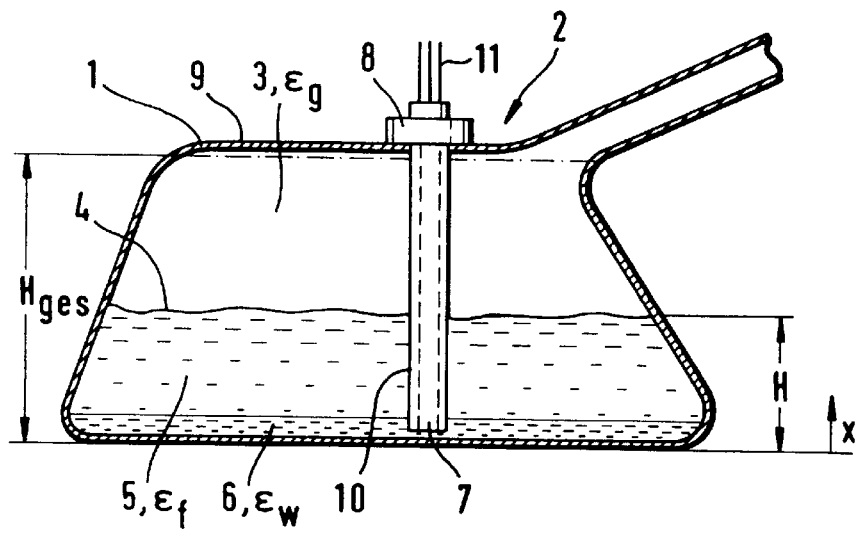
FIG. 1 shows a filling level sensor according to the invention in the installed state.

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Identical parts in the figures are provided with identical reference symbols. FIG. 1 shows a fuel tank 1 of a vehicle. A filling level sensor 2 according to the invention is inserted into tank 1. The tank 1 is filled up to the height H; the fillable height is $H_{ges}$. Layers with different dielectric constants are formed within the tank 1. The gases 3 above the fluid level 4 have the dielectric constant $\in_g$, the fuel 5 itself has a dielectric constant $\in_f$ and the water layer 6, which has also settled on the floor of the tank 1, has the dielectric constant $\in_w$. The carrier 7 for the electrical devices of the sensor 2 is attached to a flange 8 which bears against the upper lid 9 of the tank 1. The electrode group of the sensor 9 is plugged into a stable pipe 10 which, in the example, is merely protected against mechanical damage. However, it is also conceivable that the pipe 10 functions as part of the electrode group, for example as an opposing electrode $E_o$. The connection lines 11 for the sensor 2, at which lines the measurement signals are tapped, are also represented in FIG. 1.

Figure 2:
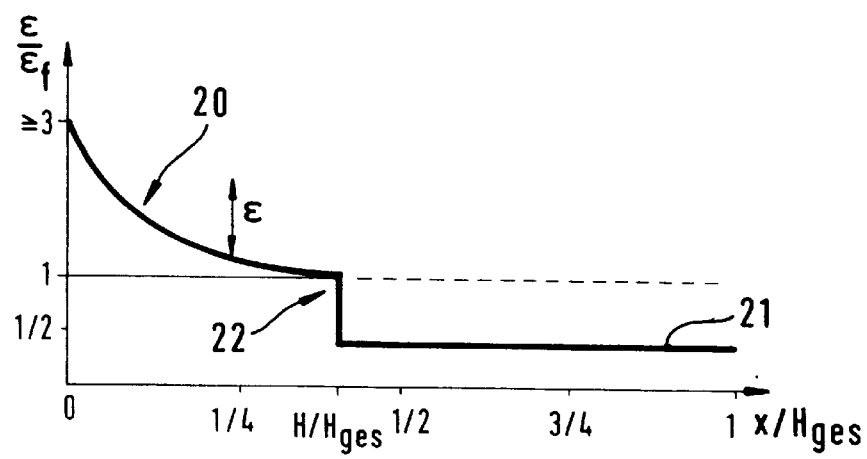
FIG. 2 shows by way of example the profile of the dielectric constant in the tank after the formation of various fluid layers.

FIG. 2 shows the variation of the dielectric constant $\in$ in the tank 1 against the height x. The tank is filled up to the height H. A stepless transition 20 of the dielectric values takes place between the fluid layers. The dielectric constant of the fluids 5 and 6 is therefore a nonlinear function of the height. As a result, when a conventional rod capacitor is used as sensor, linear behavior is not produced. The dielectric constant of the gas 21 for its part differs considerably from that of the fluid materials $\in_f$ and $\in_w$. The transition 22 between the fluid 5 and the gas 3 is sharp and can be unambiguously determined.

Figure 3:
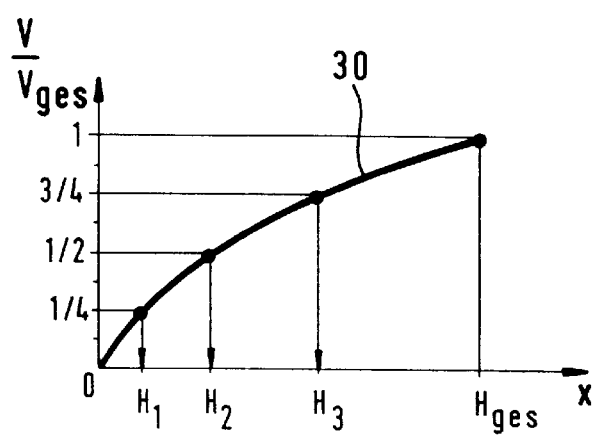
FIG. 3 shows the relative filling volume as a function of the filling height for the tank represented in FIG. 1.

The relative volume is represented in FIG. 3 as a function 30 of the height. This function 30 is as a rule nonlinear, since the shape of the tank is usually irregular. If the volume is divided into regular parts, into quarters in the example, the corresponding reference heights $H_1$, $H_2$, $H_3$ for the sensor 2 can thus be determined from them.

Figure 4:
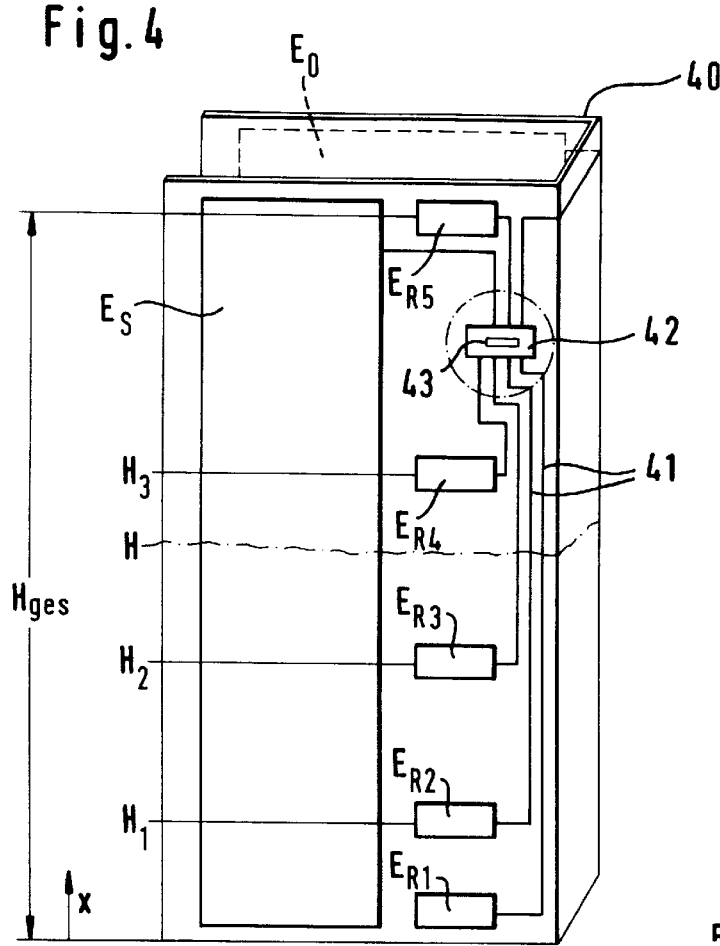
FIGS. 4 to 6 show an exemplary embodiment of the filling level sensor according to the invention with reference electrodes.
Figure 5:
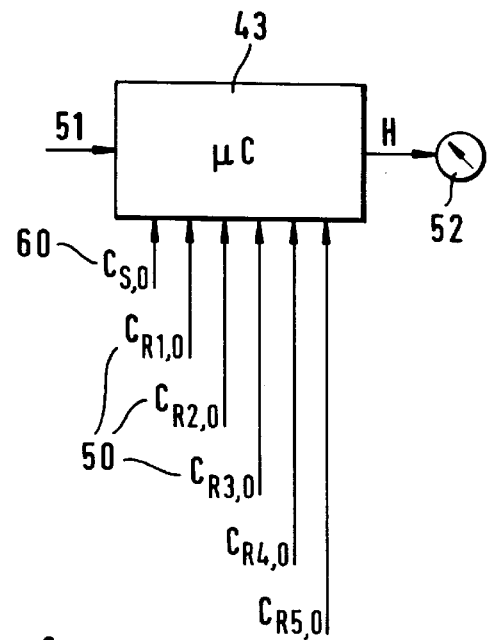
Figure 6:
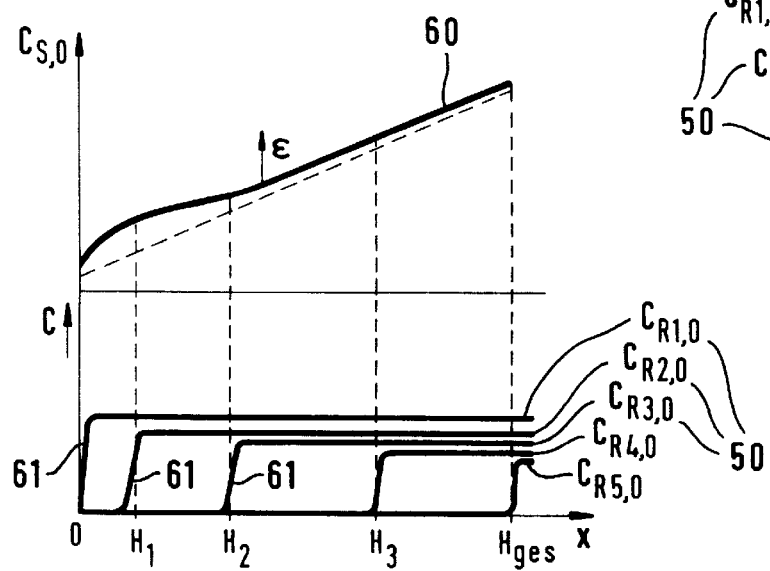

FIGS. 4 to 6 represent a first exemplary embodiment of a filling level sensor according to the invention. The measuring electrode $E_s$, the opposing electrode $E_0$, and five reference electrodes $E_{R1}$ to $E_{R5}$ are printed on to a carrier 40 which is bent in a U-shape. The electrodes are connected to an electronic circuit 42 on the carrier 40 by means of lines 41 which are also printed on. A microprocessor 43 (FIG. 5) evaluates the measurement variables 50 of the sensor and generates, with the inclusion of a signal 51 relating to the consumption of fuel, an output signal with the filling level information which is represented on a display 52. The measurement variables 50 are in each case the capacitances $C_{s,0}$, $C_{R1,0}$ . . . between the opposing electrode $E_0$ and the measuring electrode $E_S$ or the respective reference electrode $E_{R1}$ to $E_{R5}$.

The variation of the measurement variables 50 is represented in FIG. 6. It also becomes apparent here that the change in the capacitance 60 of the measuring electrode $E_s$ with the opposing electrode $E_0$ is not linear with the filling level H but rather is highly nonlinear particularly at small filling levels, where of course one would like to measure more precisely than at large filling levels. The measured value is corrected in the microprocessor 43 using the sharp transitions 61 of the capacitances of the reference electrodes $E_{R1}$ to $E_{R5}$ at the reference heights. The reference heights $H_1$, $H_2$, $H_3$ are known to the microprocessor.

Figure 7:
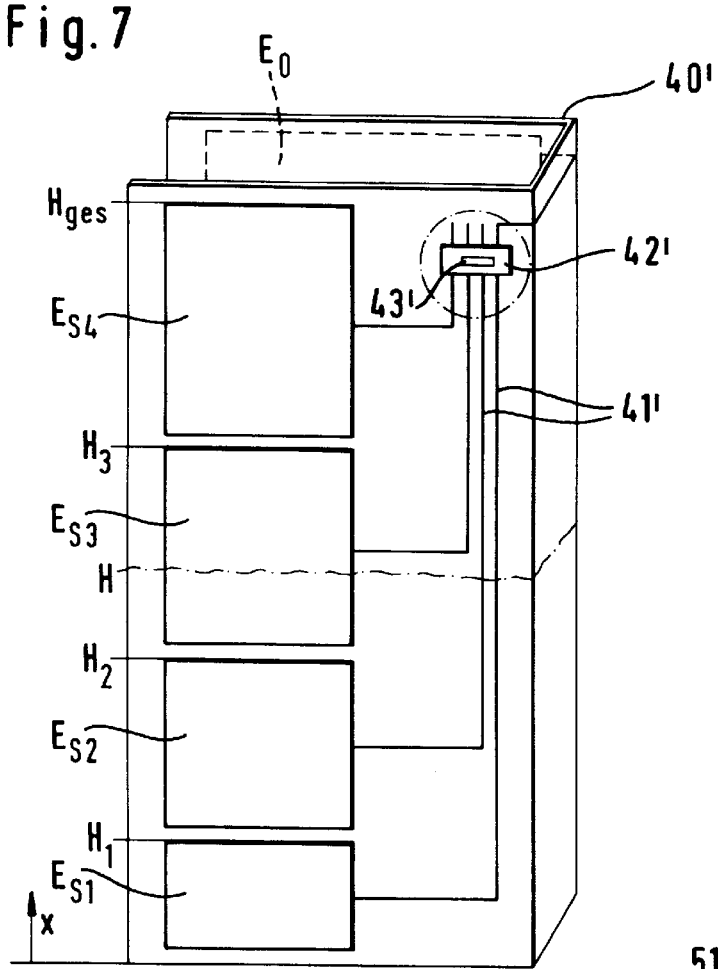
FIGS. 7 to 9 shows an exemplary embodiment of the filling level sensor according to the invention with a measuring electrode in various parts.
Figure 8:
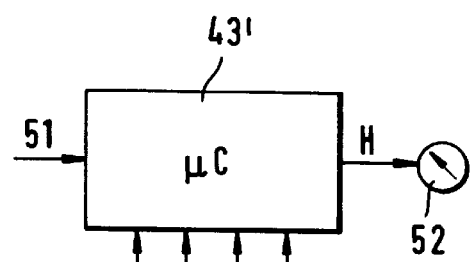
Figure 9:
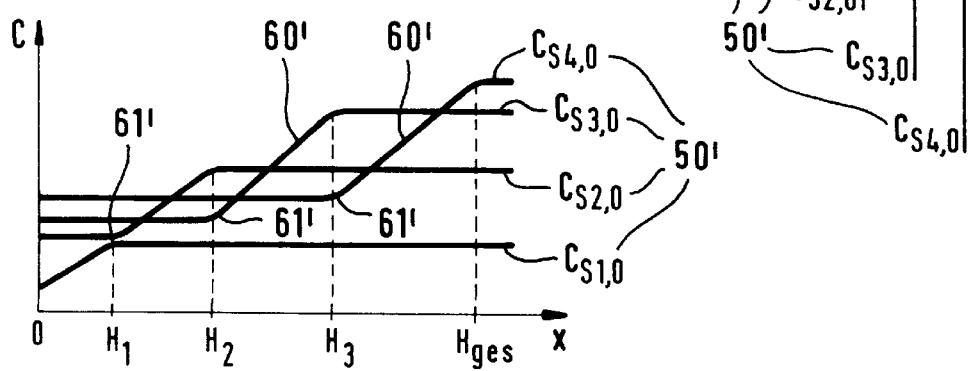

In another exemplary embodiment, such as is illustrated in FIGS. 7 to 9, four measuring electrodes $E_{S1}$, to $E_{S4}$, are arranged one on top of the other so that they pass over the entire height $H_{ges}$. When the fluid level passes over the dividing lines between the electrodes $E_{S1}$, to $E_{S4}$, there arises, in the otherwise virtually linear variation 60' of the measurement variables 50' (FIG. 9) of each measuring electrode, a kink 61' which is used again by the microprocessor 43', as described above, to correct the measurement.

Figure 10:
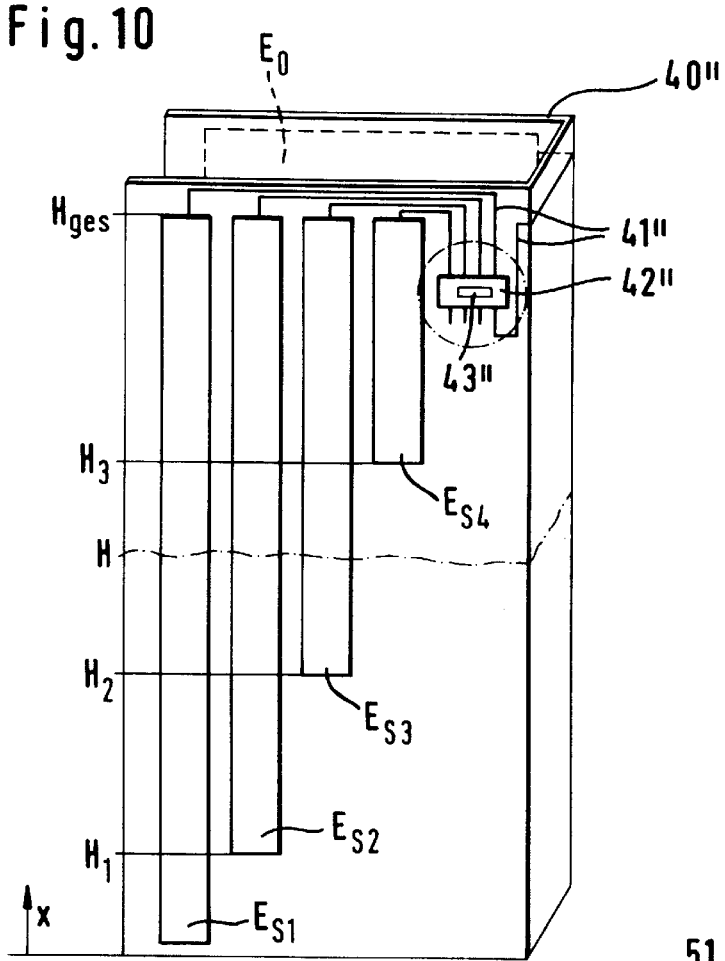
FIGS. 10 to 12 show an exemplary embodiment of the filling level sensor according to the invention with stepped, parallel measuring electrodes.
Figure 11:
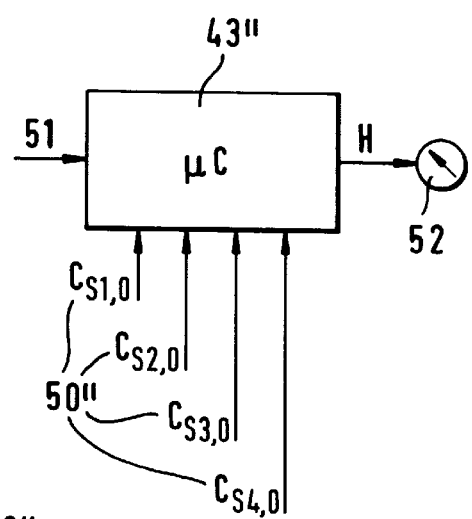
Figure 12:
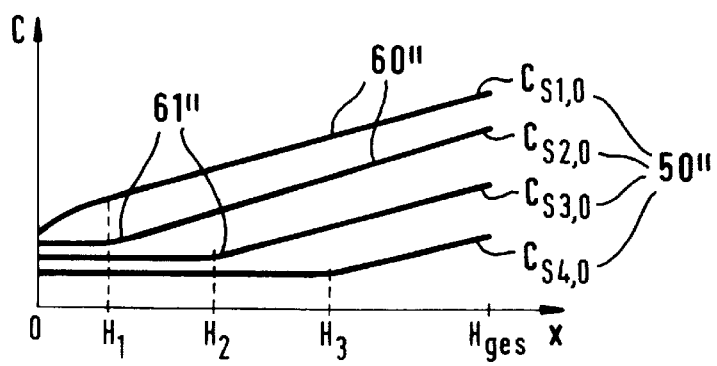

A third exemplary embodiment is shown in FIGS. 10 to 12. Here, four measuring electrodes are arranged in parallel. One of them ends at each reference height $H_1$, $H_2$, $H_3$. In this way, there arises in the otherwise virtually linear variation 60" of the measurement variables 50" (FIG. 12) of each measuring electrode $E_{Si}$, a kink 6", which is again used by the microprocessor 43", as described above, to correct the measurement.

It will be apparent to those skilled in the art that various modifications and variations can be made in the method and system of the present invention without departing from the spirit or scope of the invention. Thus, the present invention is not limited by the foregoing descriptions but is intended to cover all modifications and variations that come within the scope of the spirit of the invention and the claims that follow.

What is claimed is:

1. A sensor for measuring the filling level of a fluid in a non-uniform vessel, which comprises:

an electrode group which extends vertically over the fillable vessel height which dips into the fluid and which forms electrical capacitors whose capacitances change in a measurable fashion when there are changes in the filling level, the capacitances being determined by a connected evaluation circuit and being represented as a signal which describes the filling level;

wherein there is at least one measuring electrode which extends over the entire fillable vessel height; and wherein a plurality of reference elements are arranged at different reference heights within the fillable vessel height and the distance separating each reference element is determined such that the volume between each reference element is equivalent.

2. The sensor of claim 1 wherein there are a plurality of measuring electrodes ($E_{S1}$ to $E_{S4}$) which are arranged in such a way that each measuring electrode ($E_{S1}$, to $E_{S4}$) has a significant change in width at a reference height ($H_1$, $H_2$, $H_3$) assigned to it, and wherein the entire fillable vessel height ($H_{ges}$) is passed over by the measuring electrodes ($E_{S1}$, to $E_{S4}$).

3. The sensor of claim 1, wherein there is an opposing electrode ($E_O$) which forms electrical capacitors with all the measuring electrodes ($E_S$; $E_{S1}$, to $E_{S4}$).

4. The sensor as claimed in claim 3, wherein the reference elements (ER1 to $E_{R5}$) are reference electrodes, and the one opposing electrode ($E_O$) also forms electrical capacitors with all the reference electrodes.

5. The sensor as claimed in claim 1, wherein the reference elements ($E_{R1}$ to $E_{R5}$) are thermistors.

6. The sensor as claimed in claim 1, wherein the distances between the reference heights ($H_1$, $H_2$, $H_3$) at small filling levels are smaller than at large filling levels.

7. The sensor as claimed in claim 1, wherein the reference heights ($H_1$, $H_2$, $H_3$) are selected such that even when the vessel (1) is irregularly shaped, a regular division of the filling volume by the reference heights ($H_1$, $H_2$, $H_3$) is produced.

8. The sensor as claimed in claim 2, wherein the electrode group is arranged on a bent carrier (40, 40', 40").

9. The sensor as claimed in claim 2, wherein the evaluation circuit (42, 42', 42") is arranged on the same carrier (40, 40', 40") as the electrode group.

10. The sensor as claimed in claim 2, wherein the carrier (40, 40', 40") for the electrode group is composed of enameled sheet steel.

11. The sensor as claimed in claim 2, wherein the electrode group is implemented on its carrier (40, 401, 4011) as a printed circuit.

12. A method for measuring the filling level in a non-uniform vessel, using a filling level sensor having an electrode group which extends vertically over the fillable vessel height which dips into the fluid and which forms electrical capacitors whose capacitances change in a measurable fashion when there are changes in the filling level, the capacitances being determined by a connected evaluation circuit and being represented as a signal which describes the filling level;

wherein there is at least one measuring electrode which extends over the entire fillable vessel height; and wherein a plurality of reference elements are arranged at different reference heights within the fillable vessel height such that the distance separating each of the reference elements results in an equivalent volume between the reference elements and wherein the filling level display is corrected with the discontinuities in the electrical behavior of the sensor which results owing to the arrangement of the measuring electrodes and the reference elements when the filling level changes beyond a reference height and wherein each of the reference elements have a shape proportional to the volume represented at the different reference heights.

13. The method as claimed in claim 12, wherein the measurement signal of the filling level sensor (2) is corrected with a signal relating to the removal of fluid (51).

14. The method as claimed in claim 13, wherein the total value of the removal of fluid (51) which is converted into a height value is subtracted from the last measured value of the filling level (H), at least between two reference heights ($H_1$, $H_2$, $H_3$), and the current measured value is corrected with the result.

* * * * *